(12) United States Patent
Dujari

(10) Patent No.: US 6,233,606 B1
(45) Date of Patent: May 15, 2001

(54) AUTOMATIC CACHE SYNCHRONIZATION

(75) Inventor: Rajeev Dujari, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/203,303

(22) Filed: Dec. 1, 1998

(51) Int. Cl.[7] ................................................. G06F 13/00
(52) U.S. Cl. ................................................ 709/213
(58) Field of Search ...................................... 709/213

(56) References Cited

U.S. PATENT DOCUMENTS

| | | | |
|---|---|---|---|
| 3,985,998 | 10/1976 | Crafton | 235/380 |
| 5,390,318 | 2/1995 | Ramakrishnan et al. | 711/158 |
| 5,442,760 | 8/1995 | Rustad et al. | 712/215 |
| 5,628,015 | 5/1997 | Singh | 713/200 |
| 5,737,599 | 4/1998 | Rowe et al. | 707/104 |
| 5,787,470 | 7/1998 | DeSimone et al. | 711/124 |
| 5,787,475 | 7/1998 | Pawlowski | 711/137 |
| 5,863,207 | 1/1999 | Powell | 434/352 |
| 5,864,852 | 1/1999 | Luotonen | 713/201 |
| 5,889,958 | 3/1999 | Willens | 709/229 |
| 5,991,760 | 11/1999 | Gauvin et al. | 707/10 |
| 6,061,715 | 5/2000 | Hawes | 709/203 |
| 6,067,565 | 5/2000 | Horvitz | 709/218 |
| 6,085,226 | 7/2000 | Horvitz | 709/203 |
| 6,112,231 | 8/2000 | DeSimone et al. | 709/213 |

*Primary Examiner*—Kenneth R. Coulter
(74) *Attorney, Agent, or Firm*—Michalik & Wylie, PLLC

(57) ABSTRACT

A method and system for reducing the number of conditional requests for network content to a server by maintaining state for selected URIs in a local cache indicative of a confidence level that the files are unchanged. When a request for content is received that corresponds to such a URI in the cache, a synchronization time is determined based on a confidence level for that URI. If the synchronization time is achieved, a conditional request is sent to the server, otherwise the URI data is returned from the cache to respond to the request. Synchronization intervals for such files may be increased as the likelihood that the item is unmodified increases. URIs may need to be of a certain content type and required to pass a confidence test before being selected for automatic synchronization.

41 Claims, 7 Drawing Sheets

AUTOMATIC CACHE SYNCHRONIZATION

FIELD OF THE INVENTION

The invention relates generally to computer systems, and more particularly to the caching of content such as downloaded network content.

BACKGROUND OF THE INVENTION

For network client applications, such as web browsers, a limiting performance factor is often low bandwidth to the server. To mitigate this low-bandwidth problem, network client applications often cache content replicated from servers, so that as much information as possible is kept available on the client user's hard drive. As data access times from the hard drive and RAM are typically orders of magnitude faster than download times, some or all of a server's content may often be rapidly accessed from the cache with little or no downloading of data from the server. Other types of caching are directed to similar problems.

In general, to cache content, the local machine stores the data in a database, file system or system memory. To retrieve content, the cache is queried for items with acceptable attributes and one is chosen according to the application's criteria. For example, more than one translation of a text document might be acceptable to a user.

If there is a strict mapping of at at most one acceptable cached item per query, the content can be indexed by a unique lookup key, such as a Uniform Resource Identifier (URI), a compact string of characters for identifying an abstract or physical resource. Examples of URIs include URLs (Uniform Resource Locators), URNs (Uniform Resource Names), and other standard namespaces. A URI may be used as the lookup key to a cache, as can other names, such as a globally unique identifier (GUID).

While content caching thus provides substantial performance improvements, a problem with caching is that the locally cached content is static, whereas the content (e.g., network content) may or may not have changed. To avoid this problem, HTTP (hypertext transfer protocol) provides for sending a conditional request, e.g., an "If-Modified-Since" (IMS) request, an "If-None-Match" request, or the like to the server, identifying the content by a timestamp or entity tag. When the server receives such a conditional request, it uses the timestamp and/or entity tag to test whether the content has changed, and, if the content has not changed, the server responds with a "not modified" response, otherwise the server provides the modified content.

While this provides an overall increase in the available network bandwidth by reducing the amount of data that needs to be transmitted, not much in the way of savings is achieved at the server end. More particularly, the server often does almost as much work to determine if a content has been modified as it takes the server to simply retrieve and return the corresponding requested content. At the same time, many conditional requests may be made for content that is rarely, if ever, modified. This wastes server resources, increases client latency and also consumes available bandwidth.

One solution is to have the provider of the content indicate an "Expires" header comprising a date/time stamp, "Cache-Control" header specifying a max-age relative to the current time, or the like. When cached, the local system ordinarily does not send a conditional request before the particular time determined by the expiry mechanisms. However, this only works when the content provider provides an appropriate timestamp header, which frequently does not happen, sometimes because it is not appropriate for the content to have a distant expires time, e.g., it is expected to change frequently, and sometimes because it is simply not used by the provider.

Another solution is to have the local system only occasionally check to determine if cached content has been modified, based upon some criteria such as user action or a time schedule. For example, when particular content that is in the cache is requested, a browser may send an If-Modified-Since request for that content only once per browser session and/or once per day, and so on, (although the user can force a refresh as desired). This solution may work in conjunction with expiry mechanisms, for example, always check if the content is known to be expired, otherwise check according to the schedule.

However, both solutions still result in a large number of conditional requests being sent for content which rarely, if ever, changes. Explicit expiry information from the server often fails for static content since many providers do not use it, while the scheduled refreshing solution reduces conditional requests to an extent but still results in many requests for content that has not been modified. For example, a typical user may only browse much of the cached content once per session and/or once per day, whereby this second solution hardly, if at all, results in a reduced number of conditional requests taking place.

SUMMARY OF THE INVENTION

Briefly, the present invention provides a method and system for reducing the number of requests for cached content, such as conditional requests for network content to a server, by maintaining state for selected URIs or the like in a local cache indicative of a confidence level that the content is unchanged. Selected URIs may be from among content types which are less likely to change. URIs must achieve a certain confidence level by passing one or more confidence tests before they are placed in an automatic synchronization mode, otherwise those URIs are considered volatile.

When a request for content is received that corresponds to a cached data that is in the automatic synchronization mode, a synchronization time is determined based on a confidence level for that URI. If the synchronization time is achieved, (i.e., by the current time), a conditional request is sent, otherwise data is returned from the cache to respond to the request. Synchronization intervals for such URIs may be increased as the likelihood that the item is unmodified increases.

Other advantages will become apparent from the following detailed description when taken in conjunction with the drawings, in which:

DETAILED DESCRIPTION

Exemplary Operating Environment

Figure 1:
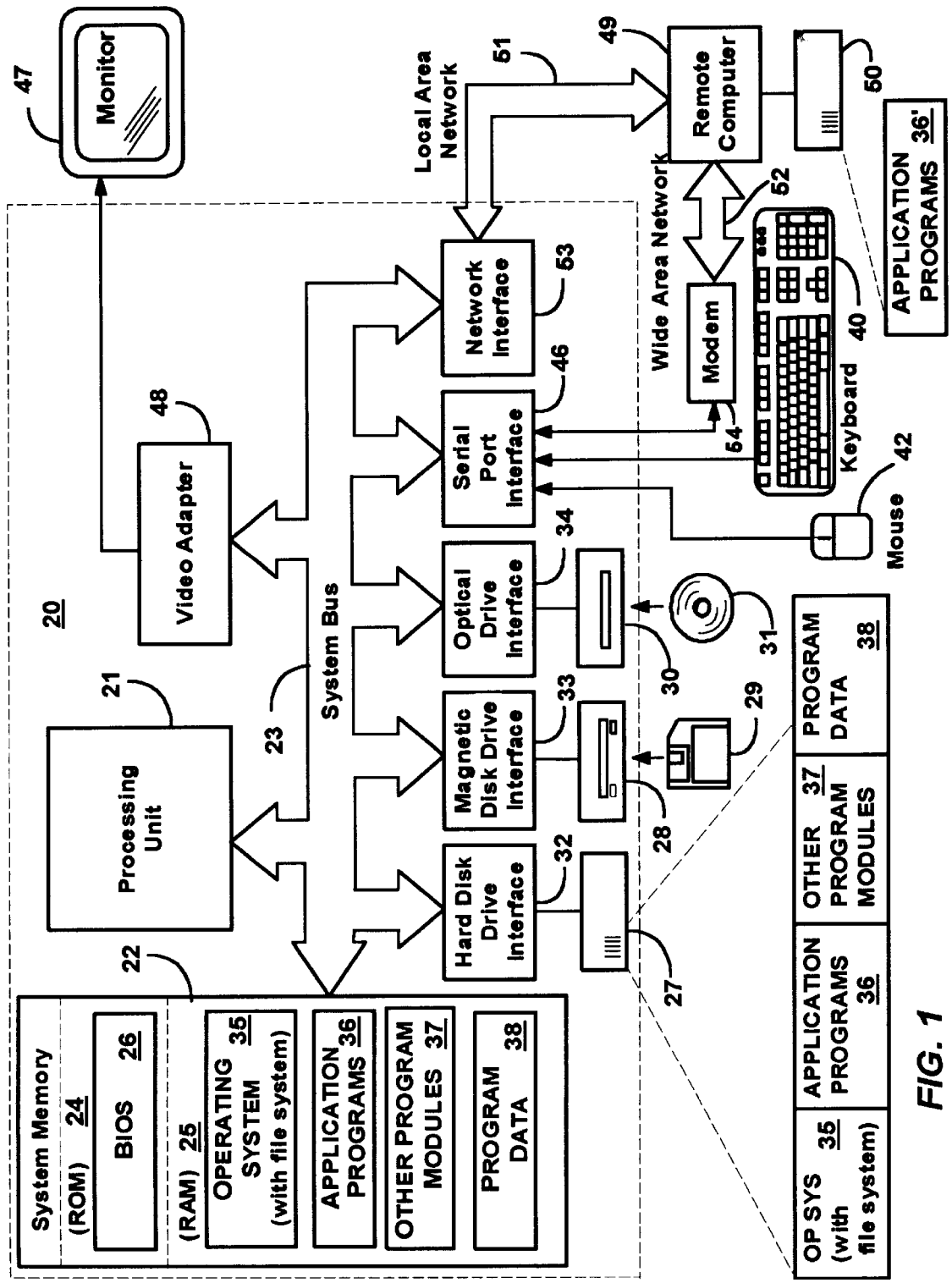
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Automatic Cache Synchronization

In general, a cache is a store of mappings between inputs and outputs of some relatively expensive function. Caches attempt to speed performance of the function by exploiting locality of reference. The function might be a local computation, a remote network operation, or even user input. For example, a cache may record the results of performing a function in case the inputs are repeated. A cache may also try to anticipate similar inputs and might perform the function in advance as a background operation. Computational caches reduce the need for repeating complex calculations, an optimization also known as memoization, e.g., caching the results of a URL parsing function. This function is time-invariant, so that results may be stored in the cache indefinitely. A user interface (UI) cache may reduce the number of dialogs or the amount of data entry that may slow or annoy users. For example, a global variable may track if a user selected a checkbox to disable a particular dialog. Another example is a password cache, which might be persisted in a store encrypted by the user's logon password. Typically a cache uses the inputs as a database lookup key to get an exact match, however, some applications may have fuzzy matching criteria, for example any version between three and six of a particular component.

A more complicated cache is used by the file system to track valid filenames for a directory. In this case the function is not time-invariant, so the cache needs a notification mechanism to remain coherent. By way of example, if a file is deleted from the directory, its name should be removed from the cache or the cache should be completely invalidated. Conversely, if a file is added to the directory, it should be added to the cache or the cache should be marked as incomplete.

Network caches can reduce round-trip latency perceived by the client, load on the server, and network traffic. In the extreme case of the client or server being offline from the network, the cache serves as the only source of data. Examples of network caches are Microsoft® Corporation's Internet Explorer's HTTP (web) cache, DNS (name resolution) cache, and the Windows® NT file system network redirector cache (CSC). Some network caches may be time-invariant, such as a server that archives versions of software which are generally never updated later. This is a special case of network caches that may be incoherent with the server. The mechanism of querying the server to determine if cached data is stale is called synchronization. While the present invention is primarily described with reference to synchronizing network caches for network content, it is understood that the present invention is applicable to virtually any type of cache.

Figure 2:
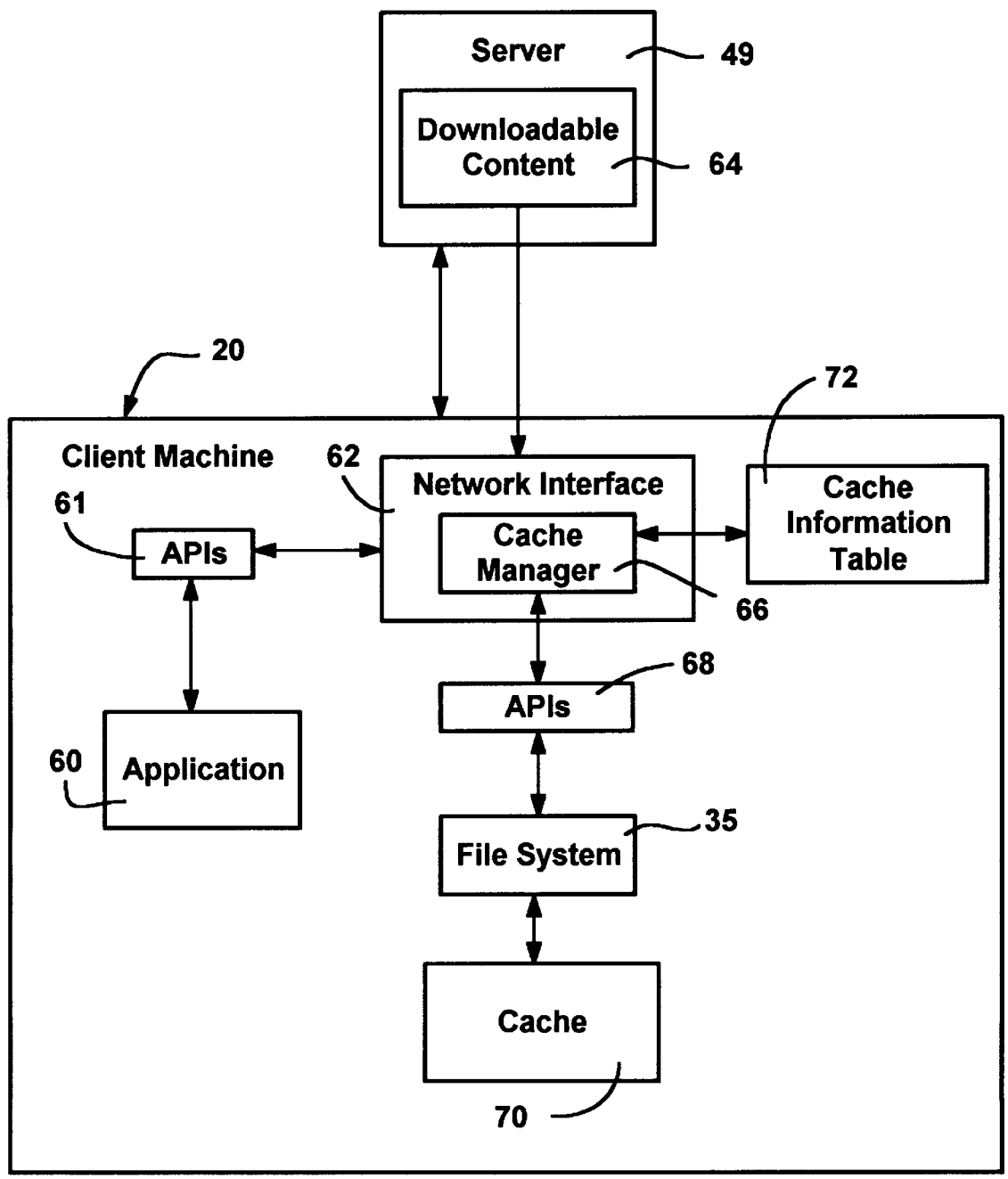
FIG. 2 is a block diagram representing a general architecture for caching content into which the present invention may be incorporated.

Turning to the drawings, FIG. 2 shows a generalized conceptual model of the present invention wherein a network application 60 such as a browser in a client machine (e.g., the personal computer system 20) communicates via APIs 61 and a network interface 62 with a server (e.g., the remote computer 49) in order to download content 64 therefrom. Communication between the client 20 and the server 49 may take place using one of several well-known network protocols, such as hypertext transfer protocol (HTTP), file transfer protocol (FTP), Common Internet File System (CIFS) protocol, or Gopher, although for purposes of simplicity, the invention will be primarily described with respect to HTTP. Content available through these protocols may also be downloaded from the server to the client by alternative means, such as a multicast protocols or CD-ROM installation, for example. As used herein, "server" or "network server" includes any machine or combination of machines having content thereon. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

In any event, the network interface 62 includes or otherwise accesses a cache manager component 66 that includes code for caching some or all of the content 64, ordinarily via application programming interface (API) calls through APIs 68 to the operating/file system 35. For example, each distinctly-referenced portion of a server's content 64 may be stored as a file in one or more caches 70. Note that some or all of the various components referenced herein may be combined with or included within other components, while others may be separate from one another and be appropriately invoked as needed. For example, the cache manager component 66 may be part of the network interface 62, or application 60 (e.g., browser) code, or may be a separate component, (e.g., object, dynamic link library function and so on) that other network applications may call on.

As also shown in FIG. 2, the cache manager 66 accesses a table of cache information 72 or the like, including for example, a list of files in the cache 70 for corresponding local file system references (e.g., filenames) with server references (e.g., URIs). The table 72 also includes any expiry information for each cached file. As described in more detail below, the cache information table 72 may be used to facilitate the automatic cache synchronization of the present invention.

Figure 3:
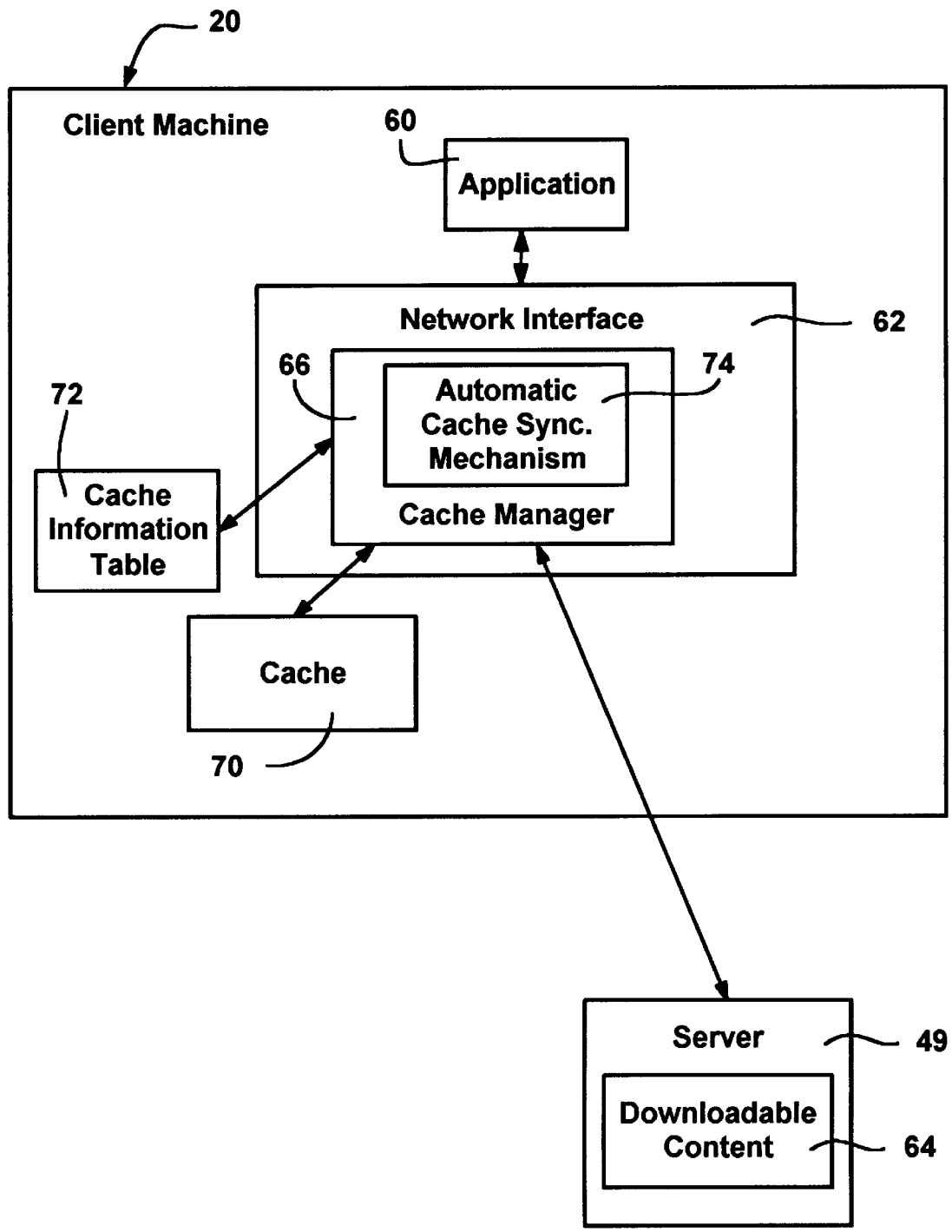
FIG. 3 is a block diagram generally representing various components for implementing the method and system of the present invention.
Figure 4:
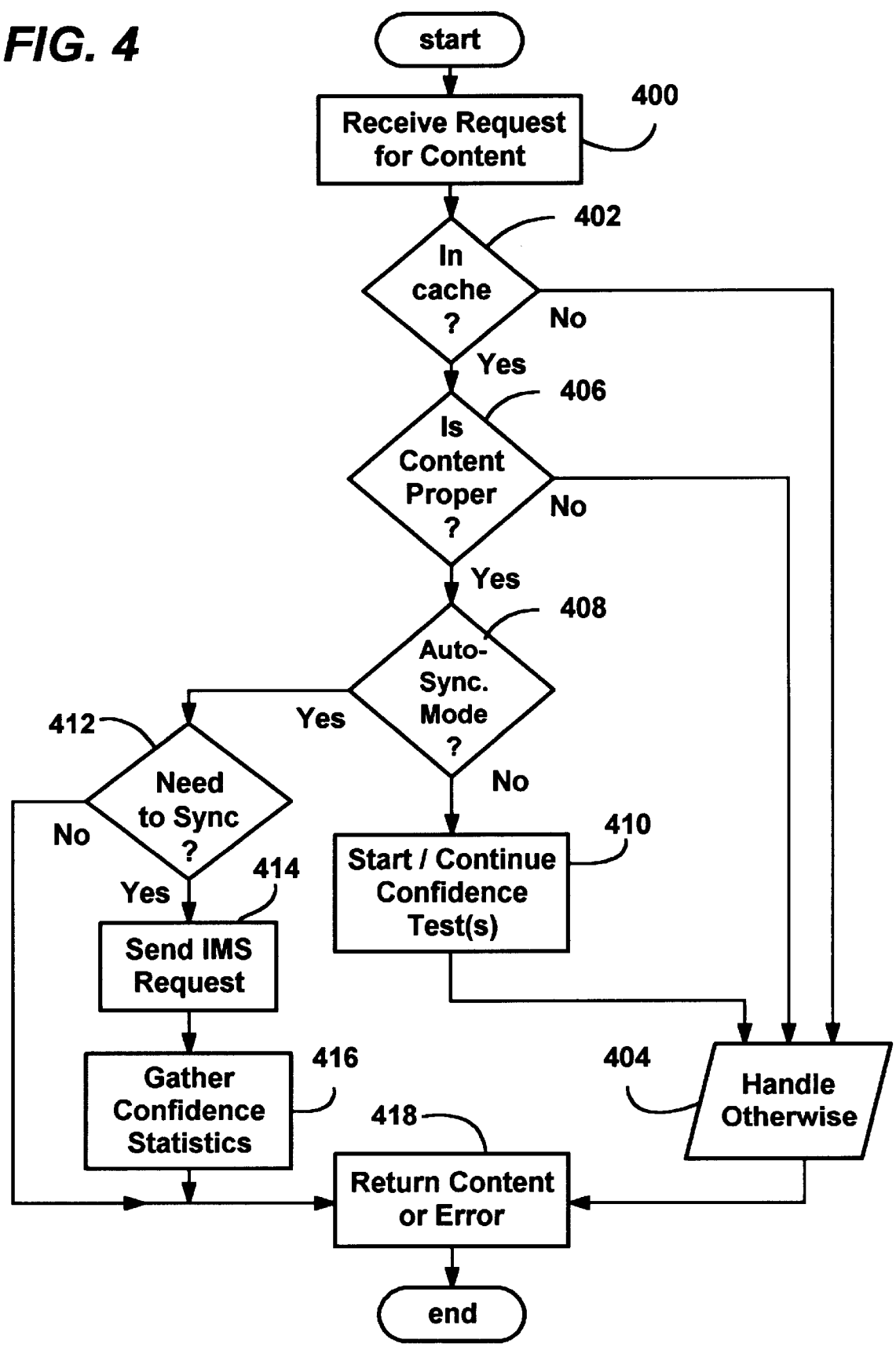
FIG. 4 is a flow diagram providing a general overview of various aspects of the present invention.

In accordance with one aspect of the present invention and as generally represented in FIG. 3, the cache manager component 66 includes an automatic cache synchronization mechanism (process) 74 that determines whether cached content may be automatically synchronized. To this end, when cached content is requested, the automatic cache synchronization mechanism 74 works with the cache manager 66 to test, to a predetermined level of confidence, whether requested content is sufficiently stable (unchanging) to bypass synchronization thereof. As described in more detail below, the cached content is returned without sending a conditional request to the server if the content is determined to be sufficiently stable. If the content may be stable, but the predetermined level of confidence has not yet been achieved, the automatic cache synchronization mechanism 74 gathers and maintains statistics on the stability of the content until the content is determined to be either stable or volatile.

Although not necessary to the present invention, for efficiency, the present invention may select only certain types of content for automatic synchronization thereof, i.e., those which are deemed most likely to be stable. At present, image data (e.g., JPEG or GIF files) are considered the most likely to be stable, with animations and other like data also being likely candidates. As can be readily appreciated, however, the present invention is not limited to any particular content types and indeed, may operate without regard to content type. Of course, one practical reason to limit the invention to certain content types is that some content types are likely to change frequently, and thus should not be tested for stability nor otherwise possibly prevented from being refreshed on a regular basis. Thus, a significant advantage may be obtained by distinguishing among content types, thereby increasing operating efficiency.

As described in more detail below, the predetermined confidence level is achieved generally by content that does not change for a sufficient period of time, i.e., the content has to pass a "time" test. Thereafter, a second test is performed to ensure that the content has been checked enough times and yet has still not changed, i.e., a "hit" test is performed. If the confidence level is not reached, i.e., the content has been modified before the tests were passed, the automatic cache synchronization mechanism 74 marks the content as volatile and thus ineligible for automatic synchronization. However, if the confidence level is reached, i.e., the time test and hit test are passed and the content has remained unmodified, the automatic cache synchronization mechanism 74 enters the content into an automatic synchronization mode. In general, when content is entered into the automatic synchronization mode, that content is not checked to see if it has been modified until a time is reached that is determined by the automatic cache synchronization mechanism 74. This checking time may be variable on a per URI basis, e.g., the checking time may be increased each time thereafter that the content is checked and determined to be unchanged.

In this manner, the interval for re-checking particular content (e.g., sending an IMS request) may be increased as the confidence level grows for that content, in accordance with a suitable algorithm. The various information maintained with each URI, e.g., whether volatile or not, the confidence statistics such as hit counts, whether in the automatic synchronization mode or not, and so on are preferably maintained in the cache information table 72.

Turning now to an explanation of the operation of the present invention with particular reference to the flow diagrams of FIGS. 4–7, FIG. 4 shows the general overview of the cache synchronization process in accordance with one aspect of the present invention. Beginning at step 400, when a request for content is received, the cache manager 66 first looks to see at step 402 if the requested content is in the cache 70. If not, step 402 branches to step 404 wherein the request is otherwise handled, i.e., the request is sent to the server to retrieve the content. If however at step 402, the requested content is in the cache 70, step 402 continues to step 406 which determines if the content is the appropriate type of content for the automatic updating thereof. Any desired tests may be used at step 402 to differentiate certain content types for automatic synchronization. For example, as generally described above, certain types of content (e.g., image types) are not likely to be modified very often, whereby those types will particularly benefit from the present invention and are thus included. Moreover, as generally described below, specific URIs of those content types are known to be volatile (frequently changed), whereby those specific URIs are not suitable for automatic synchronization. Indeed, in one preferred optimization, the URI is immediately marked as volatile if the content-type is not an image, and is not checked each time a cache entry is received. Other tests may be used, for example, testing if the user has specifically indicated (e.g., via a dialog box) that certain content is not to be automatically synchronized. In any event, if the content is not appropriate for automatic synchronization, step 406 branches to step 404 to otherwise handle the request, e.g., send a conditional (e.g., IMS) request to the server.

However, if at step 406 the content is appropriate, step 408 is next executed which tests to see if the URI has already been entered into an automatic synchronization mode, whereby in accordance with the present invention, the content will be synchronized according to a schedule set therefor in the cache manager 66. Such mode information is preferably maintained as a flag in the cache information table 72, however the mode may be dynamically determined from statistics each time content is requested. If at step 408 the content has not yet reached the automatic synchronization mode, step 410 is executed which starts (or continues if already started) a confidence test to determine whether the content is stable enough to qualify for automatic synchronization thereof. As described in more detail below, the confidence test generally comprises a "time" test and a "hit" test, two tests which essentially filter out volatile URIs from the candidates for automatic synchronization. The content is then handled via an IMS request or the like at step 404.

Conversely, if at step 408 the content is in the automatic synchronization mode, step 412 is executed which checks whether some condition has been met whereby the content needs to be synchronized. For example, even if very confident that particular content is stable, it should sometimes be checked. Step 412 thus may check how long that content has been in the cache since last checked, and/or how many times it has been checked to establish a checking time based on a confidence level. If it is determined that an update check is not needed at this time, then step 412 branches to step 418 to return the cached content, unchecked. If however it is determined that an update check is needed, then step 412 branches to step 414 to send a conditional (e.g., IMS) request to the server (unless skipped by some other criteria as described below, e.g., only send once per session). The server then (typically) returns with either not-modified status, the content, or an error. Any confidence statistics are gathered at step 416, such as by incrementing a hit counter if the content did not change. Lastly, at step 418, the requested content or other appropriate message is returned to the client.

Note that anytime the request for URI data is decoupled from the cache synchronization, it is feasible for the server or client application to specify that data may be served from the cache first. Then, a background synchronization in anticipation of the next access may be performed. For example, an initial confidence level and/or corresponding "time to synchronize" may be predetermined for certain cached URI types such that the cache is directly used and direct synchronization is not requested until at least one such background synchronization has been performed therefor.

Similarly, the hit counter may be incremented or reset as appropriate through a notification mechanism that need not download the content if modified. For example, the last-modified times for a URI might be indicated by electronic message (email) sent to the client, or in a network broadcast (multicast) to which the client subscribes.

Figure 5:
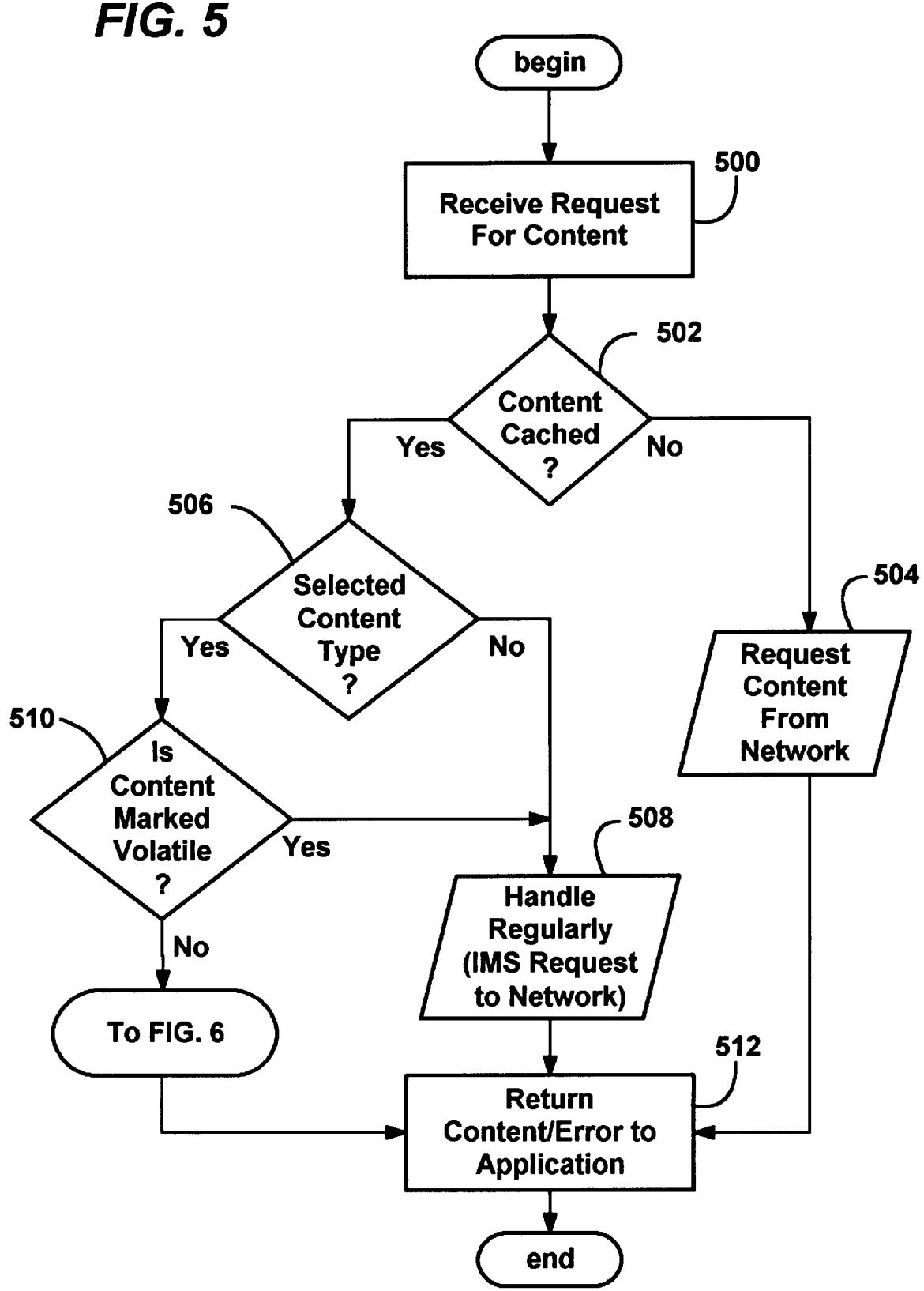
FIG. 5 is a flow diagram generally representing the steps taken to determine if cached content is suitable for the automatic synchronization thereof in accordance with an aspect of the present invention.
Figure 6:
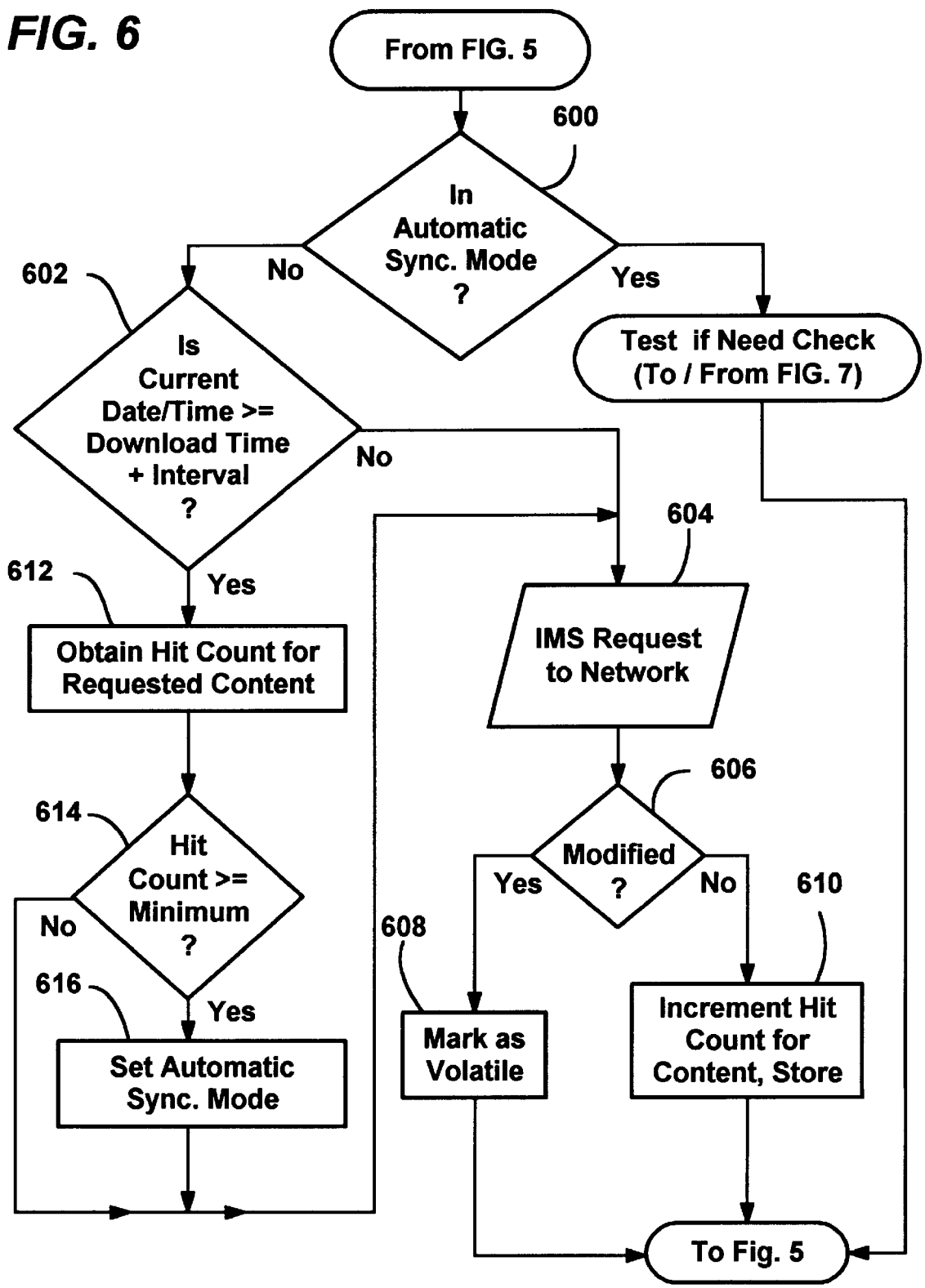
FIG. 6 is a flow diagram generally representing the steps taken when cached content is deemed suitable for possible automatic synchronization thereof in accordance with an aspect of the present invention.
Figure 7:
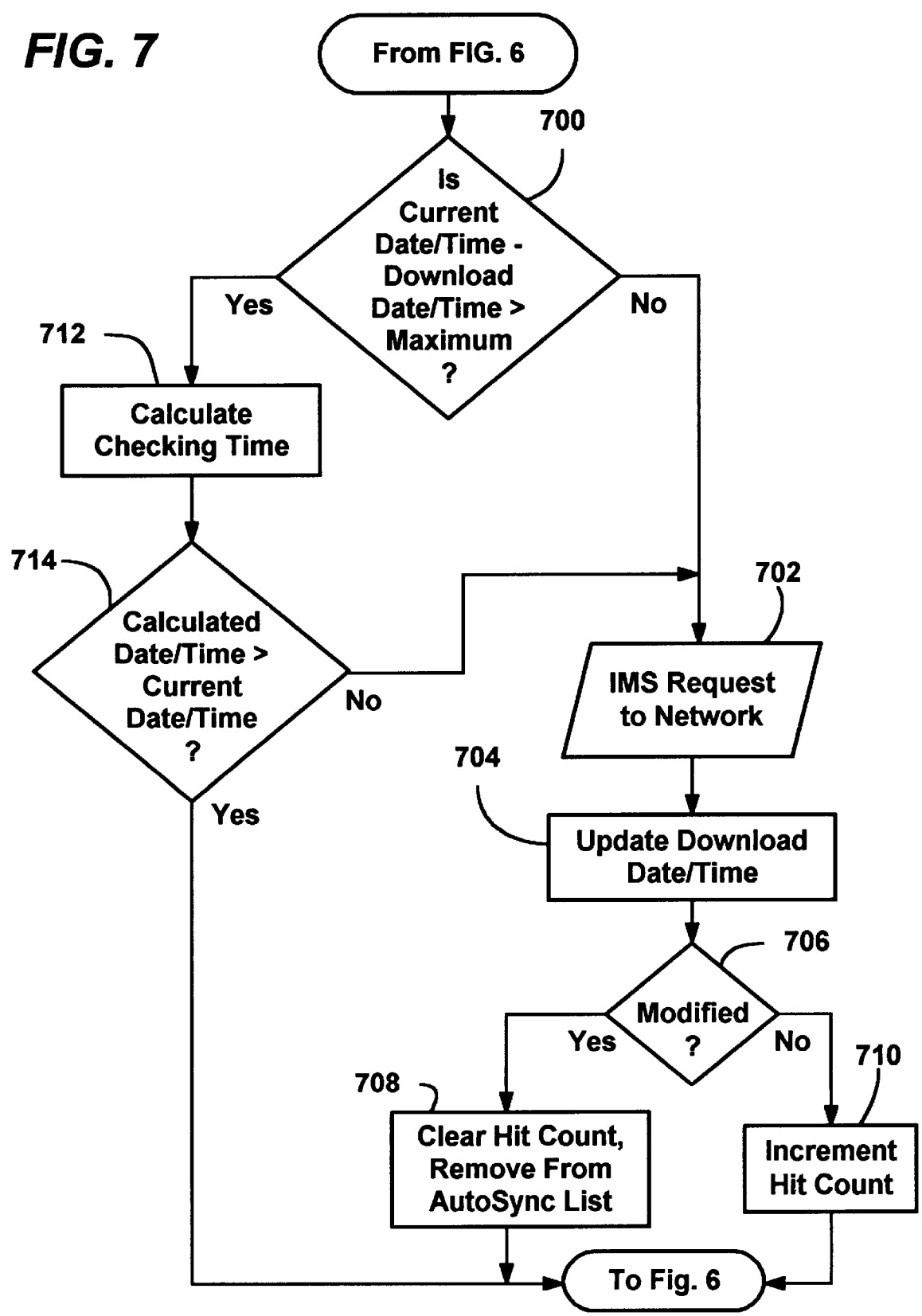
FIG. 7 is a flow diagram generally representing the steps taken with cached content in an automatic synchronization mode in accordance with an aspect of the present invention.

FIGS. 5–7 illustrate exemplary steps of the automatic cache synchronization process of the present invention in more detail. At step 500, when a request for content is received from an application 60, the cache manager 66 first checks at step 502 whether the content is in the cache 70. If not, then step 502 branches to step 504 where the content is requested from the network in a known manner, after which the content (or an error) is returned to the application 60 at step 512. However, if the requested content is cached, step 502 branches to step 506.

As described above, step 506 checks to see if the requested content corresponds to a certain type of data known to be a type that is often stable, e.g., images. In general, the automatic synchronization process 74 accomplishes this at step 506 by comparing the requested content's type against a list of specified content types, such as in a default list, possibly modified by the user, maintained in a non-volatile storage. The content type may be determined from a Content-Type header, examining the URI or Content-Disposition header for a file extension, performing various tests on the content data, or some combination of these and other methods. If the content is not a specified type, then step 506 branches to step 508 which handles the request in a regular, well-known manner, e.g., the cache manager determines according to some other user-based criteria (e.g., once per session) whether to send an IMS request to the network, and returns an appropriate response to the application 60 at step 512.

However, if the content corresponds to a selected type, then step 506 branches to step 510 which tests if the particular URI requested is known to be volatile, (from previous requests therefor). This may be performed by accessing the information associated with the cached content, (maintained in the cache information table 74), which preferably includes a flag indicating such volatility. If the flag indicates the URI is volatile, automatic synchronization is improper, and thus step 510 branches back to steps 508 and 512, wherein the request is handled as described above. Conversely, if the content is not flagged as volatile, then step 510 branches to step 600 of FIG. 6.

Note that volatile URIs and/or content of the incorrect type may be considered as having no confidence level, whereby the time for synchronizing the URI is immediately achieved with respect to the automatic synchronization process of the present invention. However, another process, such as a user-based fixed schedule process, (e.g., once per session), may be further employed to determine whether content should be checked. As can be readily appreciated, the present invention may operate in any combination with any number of such other processes.

At step 600 of FIG. 6, the associated URI information is accessed to determine if the content has already achieved the automatic cache synchronization mode in accordance with one aspect of the present invention. If not, step 600 branches to step 602 to begin or continue the confidence test for this content. The confidence testing will ultimately determine if the URI is volatile or should enter the automatic cache synchronization mode (assuming the file remains in the cache). To this end, step 602 first determines how long the content has been in the cache 70. Step 602 thus performs the "time test" generally by comparing the current date and time against the download time (maintained with the file) plus a predetermined interval, for example one or two weeks. Note that the time test may be dependent on the content type, for example, one week for image content types, two weeks for animation content types, and so on. If the content has not been in the cache long enough, the time test is not passed, and thus step 602 branches to step 604 to send a conditional (e.g., IMS) request to the server (unless skipped by some other criteria, e.g., only send once per session). If at step 606 the server indicates the content has been modified, (e.g., by returning the content instead of a not modified response), this particular URI is flagged as volatile at step 608. Otherwise step 610 is executed to increment the hit count, as the URI remains a candidate for automatic synchronization. In this manner, the time test filters out those URIs that change frequently. Note that by coincidence, a rarely-updated URI may have just recently been changed, and consequently will be flagged as volatile. However, if desired, a volatility flag may be later removed from a URI, (e.g., by a separate process), such as if that URI remains unchanged in the cache for some predetermined period of time, whereby it can again be examined for stability.

For candidates that pass the time test, the automatic synchronization process 74 secondarily performs a "hit test" to ensure that the content URI has been checked a sufficient number of times to ensure stability. Thus, if at step 602 the content has been in the cache long enough to pass the time test, step 612 obtains a hit count maintained for the present URI, (e.g., also maintained in the cache information table 72). Note that the hit count for a URI may initially have a default value of zero. The hit count is checked against a minimum at step 614. At present the minimum is five hits, and if at step 614 the minimum is achieved, step 616 is executed to enter the URI into the automatic synchronization mode, (effective the next time at step 600), including adding the URI to an automatic synchronization list. Lastly, as shown in FIG. 6, steps 604–610 are executed as described above to check the URI, at which time the process returns to step 512 of FIG. 5.

Note that the "hit test" also may be combined with time aspects, for example, by only counting hits if they occur on different days or in different user sessions. Further, it should be noted that different types of URIs may have a different minimum hit count, and indeed, additional confidence tests beyond the time test and hit test may be performed, which also may be based on the content type if desired. As can be readily appreciated, any number of tests and/or criteria may be employed that help increase the confidence level of the stability of that particular content, although for practical purposes, the tests and criteria have to make some tradeoff between certainty and efficiency, otherwise too few URIs may qualify. For example, a time test of one year may increase the likelihood of stability, but is most likely too long.

Once a URI is in the automatic synchronization mode, step 600 detects the mode and branches to step 700 of FIG. 7. At step 700, a maximum time that the content has been cached is checked, for example six months. If the maximum time is exceeded, step 700 branches to step 702 to make a conditional request, (again, unless skipped by some other criteria, e.g., only send once per session), and at step 704 the download date and time are updated so that the URI is not always checked hereafter. Note that although not necessary to the present invention, after the server responds, a check may be performed at step 706 to determine if the content has been modified. If so, the content which was once considered stable still may be relatively stable, and thus instead of flagging the URI as volatile, its hit counter and synchronization mode may be cleared at step 708, (including removing the URI from the automatic syncrhonization list), whereby the URI will need to re-qualify for the automatic synchronization mode by again passing the tests as described above. If instead the content is unchanged, and hits are being tracked, such as for increasing a confidence level as described below, the hit counter may be increased at step 710.

However, if at step 700 the maximum time has not been reached, step 712 is executed to calculate a time at which the URI should next be checked. For example, the calculation may be based on the length of time the URI content has been in the cache and remained unchanged and/or based on the number of times the URI has been checked. In other words, as the confidence level indicating that the URI is stable increases, so does its calculated checking interval. For example, a URI that just qualified for automatic synchronization mode (e.g., less than two days ago, assuming the qualification time is stored) may result in a calculated date and time of one week since last checked, while a URI that qualified a month ago may result in a two-weeks-since-last-checked checking date. Optionally, each hit (i.e., the content was checked and resulted in not modified status) may add one day or some other duration to the calculated date. Virtually any algorithm is feasible, so long as it results in a reasonable checking time based on practical considerations. For example, one preferred algorithm determines that the time to check is twenty-five percent of the time that the content has been cached. Other fractions may similarly be used and upper and/or lower bounds may be imposed, and indeed, any non-decreasing function, including nonlinear functions, may be used. Moreover, an alternative input to the function uses the time since the last-modified timestamp. In any event, if the calculated checking date and time exceeds the current date and time as evaluated at step 714, then it is time to re-check the URI, whereby steps 702–710 are executed as described above.

As can be readily appreciated, the present invention avoids having to send a conditional request to the server each time content is requested as long as a confidence level indicates that the content is unlikely to have changed. By further eliminating certain types of content and those known to be volatile from the automatic synchronization process, the present invention efficiently focuses on those URIs which are least likely to change. Once a certain level of confidence is achieved for a particular URI, the URI can be checked less often, and the time between checks for that URI may be increased as the confidence level increases over time.

Lastly, while the present invention has been described with reference to web caching, it can be readily appreciated that the present invention applies to other types of caching. For example, in a web cache, the input is a URL and the output is some content data and metadata, (e.g. http response headers, last sync time, and so on). However, such mapping of need not be performed at a remote server, e.g., the results of mapping a username to a set of security policies may be cached. Synchronization is applicable whenever the mapping function is not time-invariant, including when it is computed by a remote server, or something at the client where the result depends on a changing environment.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method for synchronizing content with content stored in a cache, comprising the steps of, receiving a request for content, at least part of the requested content corresponding to data in the cache, determining a synchronization time for the content based on a confidence level therefor, and if a current time is before the synchronization time, returning data from the cache in response to the request.

2. The method of claim 1 wherein the step of determining a synchronization time includes the steps of, performing a confidence test to test the stability of the content, and setting an automatic synchronization mode for the content if the confidence test indicates that the content is relatively stable.

3. The method of claim 2 wherein the confidence test includes a test of the time that the content has been in the cache without having changed.

4. The method of claim 3 further comprising the step of marking the content as volatile if the content changes before having been in the cache for a predetermined time.

5. The method of claim 2 wherein the confidence test includes a test of the number of times that the content has been checked without having changed.

6. The method of claim 5 further comprising the step of marking the content as volatile if the content changes before having been checked a predetermined number of times.

7. The method of claim 2 wherein the confidence test includes a test of the time that the content has been in the cache without having changed, and a test of the number of times that the content has been checked without having changed.

8. The method of claim 7 further comprising the step of marking the content as volatile if either the content changes before having been in the cache for a predetermined time or if the content changes before having been checked a predetermined number of times.

9. The method of claim 1 wherein the step of determining a synchronization time for the content based on the confidence level includes the step of checking to determine if the content is marked as volatile.

10. The method of claim 9 wherein if the content is determined to be volatile, the synchronization time is achieved.

11. The method of claim 1 wherein the step of determining a synchronization time for the content based on the confidence level includes the step of checking to determine if the content corresponds to a specific type.

12. The method of claim 11 wherein if the content does not correspond to a specific type, the synchronization time is achieved.

13. The method of claim 1 wherein if the content does not have a minimum confidence level, the synchronization time is achieved.

14. The method of claim 1 wherein the content comprises network content corresponding to a Uniform Resource Identifier (URI), and wherein if the synchronization time is achieved, performing the step of sending a conditional request to a server for the content, and further comprising the step of gathering confidence information based on a response of the conditional request sent to the server.

15. The method of claim 14 wherein the confidence information is used to modify the confidence level for the URI.

16. The method of claim 1 wherein if the synchronization time is achieved, making a request for current content, and further comprising the steps of, receiving the current content, testing if the current content is modified relative to the cached content, and if not modified, increasing the confidence level for the cached content.

17. In a computer system, a method for synchronizing network content with content stored in a cache, comprising the steps of, receiving a request for content, at least part of the requested content corresponding to data in the cache, determining a synchronization time for a URI based on a confidence level for the URI, and if the synchronization time is achieved, sending a conditional request to a server for the content, and if the synchronization time is not achieved, returning data from the cache in response to the request.

18. The method of claim 17 wherein the step of determining a synchronization time for the URI includes the steps of performing a confidence test to test the stability of the URI and setting an automatic synchronization mode for the URI if the confidence test indicates that the URI is relatively stable.

19. The method of claim 18 wherein the confidence test includes a test of the time that the content has been in the cache without having changed.

20. The method of claim 19 further comprising the step of marking a URI as volatile if the content changes before having been in the cache for a predetermined time.

21. The method of claim 18 wherein the confidence test includes a test of the number of times that the URI has been checked without having changed.

22. The method of claim 21 further comprising the step of marking a URI as volatile if the content changes before having been checked a predetermined number of times.

23. The method of claim 18 wherein the confidence test includes a test of the time that the content has been in the cache without having changed, and a test of the number of times that the URI has been checked without having changed.

24. The method of claim 23 further comprising the step of marking a URI as volatile if either the content changes before having been in the cache for a predetermined time or if the content changes before having been checked a predetermined number of times.

25. The method of claim 17 wherein the step of determining a synchronization time for the URI based on a confidence level for the URI includes the step of checking to determine if the URI is marked as volatile.

26. The method of claim 25 wherein if the URI is determined to be volatile, the synchronization time is achieved.

27. The method of claim 17 wherein the step of determining a synchronization time for the URI based on a confidence level for the URI includes the step of checking to determine if the content corresponds to a specific type.

28. The method of claim 27 wherein if the content does not correspond to a specific type, the synchronization time is achieved.

29. The method of claim 17 wherein if the URI does not have a minimum confidence level, the synchronization time is achieved.

30. The method of claim 17 further comprising the step of gathering confidence information based on a response of each conditional request sent to the server.

31. The method of claim 30 wherein the confidence information is used to modify the confidence level for a URI.

32. The method of claim 17 further comprising the steps of testing if a content has been modified after sending a conditional request to the server, and if not modified, increasing the confidence level for that URI.

33. The method of claim 18 further comprising the steps of, receiving another request for content corresponding to the URI, determining if the URI is in the automatic synchronization mode, and if so:

determining a time for synchronizing the URI, and, if the time for synchronizing is achieved, sending another conditional request to the server, and if the time for synchronizing is not achieved, returning content data from the cache.

34. The method of claim 33 wherein if the URI is not in an automatic synchronization mode, sending another conditional request to the server, and further comprising the step of gathering information for the URI including information on whether the conditional request indicates the content has changed.

35. The method of claim 34 further comprising the step of determining whether to enter the URI into the automatic synchronization mode based on the information.

36. In a computer system, a system for synchronizing network content with content stored in a cache, comprising, a network interface for receiving a request for content, a cache manager component for determining that at least part of the requested content corresponds to data in the cache, a storage for maintaining a confidence level for the URI, and an automatic synchronization mechanism for accessing the storage to determine a synchronization time for the URI based on the confidence level therefor, the interface responding to the request by sending a conditional request to a server for the content if the synchronization time is achieved, and returning data from the cache if the synchronization time is not achieved.

37. The system of claim 36 wherein the automatic synchronization mechanism further performs a confidence test to test the stability of the URI, and sets an automatic synchronization mode for the URI if the confidence test indicates that the URI content is relatively stable.

38. The system of claim 37 wherein the confidence test includes a test of the time that the URI content has been in the cache without having changed.

39. The system of claim 37 wherein the confidence test includes a test of the number of times that the URI has been checked without having changed.

40. The system of claim 36 wherein the automatic synchronization mechanism further gathers confidence information based on a response of each conditional request sent to the server, and stores the confidence information in the storage for that URI.

41. The system of claim 40 wherein if URI content has not been modified after sending a conditional request to the server, the automatic synchronization mechanism increases the confidence level for that URI.

* * * * *

UNITED STATES PATENT AND TRADEMARK OFFICE
CERTIFICATE OF CORRECTION

PATENT NO. : 6,233,606 B1
DATED : May 15, 2001
INVENTOR(S) : Dujari

It is certified that error appears in the above-identified patent and that said Letters Patent is hereby corrected as shown below:

Column 1,
Line 27, "at at most" should read -- at most --.

Column 4,
Line 61, "memoization" should read -- memorization --.

Column 5,
Line 46, "a multicast protocols" should read -- a multicast protocol --.

Column 10,
Line 24, "syncrhonization" should read -- synchronization --.

Column 11,
Line 9, "e.g." should read -- e.g., --.
Lines 10-11, "mapping of need not" should read -- mapping need not --.

Column 13,
Line 27, line break should occur after "and,".
Lines 28-29, line break occurring after "sending" should instead occur after "and".
Line 29, "server, and" should read -- server; and --.
Line 31, line break after "achieved," should not occur.
Lines 27-33, should read:
-- determining a time for synchronizing the URI, and,
    if the time for synchronizing is achieved, sending another
conditional request to the server; and
    if the time for synchronizing is not achieved, returning content data
from the cache. --.

Signed and Sealed this

Ninth Day of November, 2004

JON W. DUDAS
*Director of the United States Patent and Trademark Office*